J. ROHRER.
Refrigerators.
No. 143,591.
Patented Oct. 14, 1873.
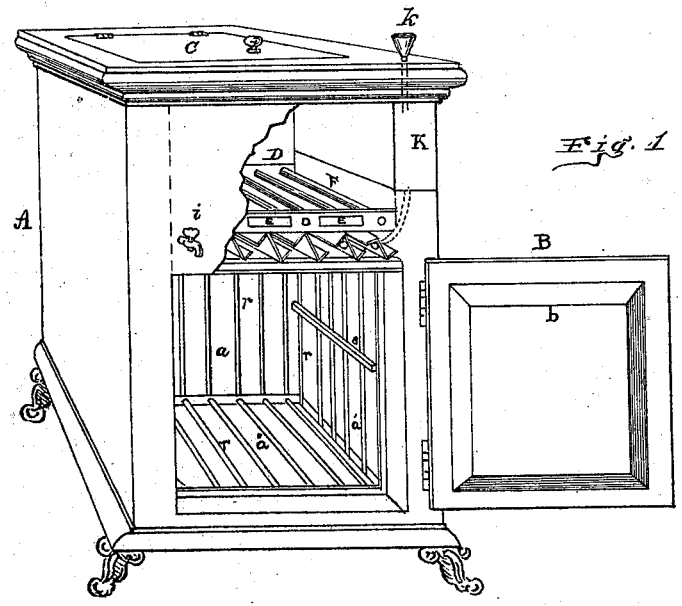
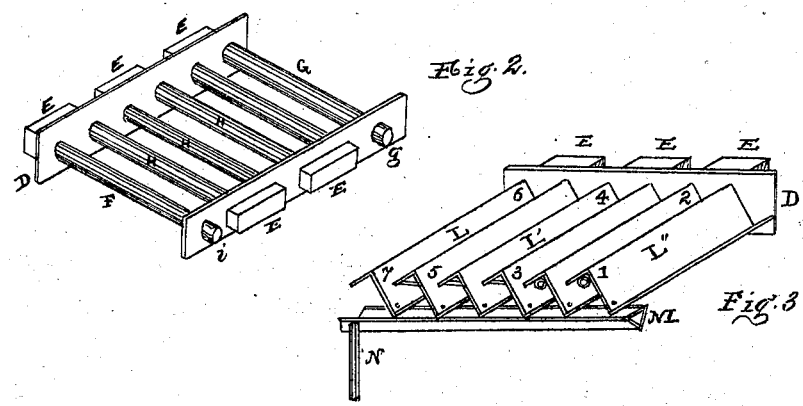
Witnesses.
H. J. Donnelly
T. Donnelly
Inventor.
Jeremiah Rohrer,
Per J. Stauffer. Att

UNITED STATES PATENT OFFICE.

JEREMIAH ROHRER, OF LANCASTER, PENNSYLVANIA.

IMPROVEMENT IN REFRIGERATORS.

Specification forming part of Letters Patent No. 143,591, dated October 14, 1873; application filed August 21, 1873.

*To all whom it may concern:*

Be it known that I, JEREMIAH ROHRER, of the city of Lancaster, in the State of Pennsylvania, have invented certain Improvements in Refrigerators, of which the following is a specification:

The object of my invention is to make additional improvements in my refrigerator, patented December 12, 1871, No. 121,899, by the introduction of a water-tank, from which the water passes through one or two series of tubes, circulating in such a manner as to become thoroughly cooled for drinking purposes, and to obviate all unpleasant odor from food, or the corrosion of zinc linings.

While I modify my draining-slats, I retain all the advantages of the open or intermediate space to allow the cold air to pass freely through and into the lower portions of the refrigerator, as in the patent referred to.

The accompanying drawings, with the description, will enable any one skilled in the art to make and use the same.

Figure 1 is a perspective view of the refrigerator with the door below open, and a portion of the upper part broken out to show the tubular ice-rack and draining apparatus in position. Fig. 2 shows said ice-rack, and Fig. 3 the draining device detached, lettered, and numbered, to which reference is made in the following description.

I claim no special novelty in the case A, with its top door c and side doors B b; but instead of making the inner wall or lining of zinc, as commonly made, I make frames, or their equivalent, of hard wood for glass to be set firmly therein, thoroughly embedded with putty or its equivalent on both sides of its edges, shown by a. Glass will be cheaper than zinc, will not corrode, and is easily kept sweet and clean. It may be well to have hard wooden or tinned metallic rods r set in front to guard or protect the glass. s shows a ledge for a shelf on each side, or any number of shelves desirable may be introduced by increasing the number of ledges. The upper portion or ice and water chamber contains a water-tank, K, on one side, open above at k, for the introduction of water. The base of the tank may be above the ice-rack, which latter may be simply a slatted box to receive the ice; or better, when made as shown by Fig. 2. The cross-bars H, for supporting the ice, may be hollow, forming a continuous tube from g to i by alternately uniting the open ends by side tubes or boxes E. The draining-slats L are made like an inclined letter Z— that is, the upper water-ledge to overhang the lower angular trough formed in the adjoining slat by the inclined position. Each of these troughs has an opening into a cross-trough, M, across the hind ends of them, into which all the drippings flow, and pass off through a pipe, N, at one end, down to the outside of the refrigerator, where they are discharged. These slats may have a piece soldered on below the upper angle to form a triangular tube, as shown by L'; or a round pipe or tube may be affixed open at the ends, shown by L'', the upper edge or water-ledge to project so as to allow the draining to drop down freely to the trough below the adjoining slats. These tubes are also alternately connected with each other by boxes or connections E to form a continuous channel from the water-tank K, in the numerical order 1, 2, 3, &c., to the terminal one at 7. This may be made to communicate with the tube G in the ice-rack, and through those marked H to E, and discharge by a spigot, i, on the outside. Thus, the ice being placed upon the hollow rounds of the rack, and against the inner side of the water-tank, from which the water is made to traverse through the several series of tubes, the upper being in direct contact with the ice, the water will be thoroughly cooled, the drippings from the ice carried off effectually, while the open spaces between the slats will allow the cold and denser air to find its way to the bottom of the refrigerator.

The space between the framed glass and outer wall may be, as usual, filled with cork-shavings, or any other non-conducting medium desirable.

The great advantage in my former patent is, the perfect draining and interstices for the free passage of cold air from the ice-rack. This I do not claim again, as it is clearly shown in my former patent, only that I therein use a central trough and tank, thus differing substantially in the arrangement of the parts as well as in the construction; therefore

What I claim as new, and desire to secure by Letters Patent, is—

The arrangement of the tubular ice-rack H E G, in combination with the draining-slats L L' L'', trough M, pipe N, and tank K, all constructed substantially in the manner, and for the purpose set forth.

J. ROHRER.

Witnesses:
WM. B. WILEY,
JACOB STAUFFER.